(12) United States Patent
Lucchese

(10) Patent No.: US 10,697,099 B2
(45) Date of Patent: Jun. 30, 2020

(54) PROCESS FOR MAKING A HOOPING DEVICE

(71) Applicant: Salvatore Lucchese, Gilbert, AZ (US)

(72) Inventor: Salvatore Lucchese, Gilbert, AZ (US)

(73) Assignee: TEX INC., Mesa, AZ (US)

( * ) Notice: Subject to any disclaimer, the term of this patent is extended or adjusted under 35 U.S.C. 154(b) by 122 days.

(21) Appl. No.: 16/013,269

(22) Filed: Jun. 20, 2018

(65) Prior Publication Data
US 2019/0390385 A1    Dec. 26, 2019

(51) Int. Cl.
*D05C 9/04* (2006.01)
*D05C 1/08* (2006.01)
*B23K 26/08* (2014.01)

(52) U.S. Cl.
CPC .............. *D05C 1/08* (2013.01); *B23K 26/08* (2013.01); *D05C 9/04* (2013.01)

(58) Field of Classification Search
CPC ............... D05C 9/00; D05C 9/04; D05C 7/02
See application file for complete search history.

(56) References Cited

U.S. PATENT DOCUMENTS

| | | | |
|---|---|---|---|
| 4,545,127 A | 10/1985 | Barry | |
| 4,767,111 A * | 8/1988 | Guenther | D05C 13/00 248/454 |
| 4,805,297 A | 2/1989 | Seneff | |
| 5,144,899 A * | 9/1992 | Allen | B41M 1/12 101/114 |
| 5,432,990 A | 7/1995 | Seneff | |
| 5,784,988 A * | 7/1998 | Burt, Jr. | D05B 39/00 112/103 |
| 5,934,210 A | 8/1999 | Lucchese | |
| 6,216,617 B1 * | 4/2001 | Burt, Jr. | D05C 9/04 112/103 |
| 7,721,923 B2 * | 5/2010 | Holt | D06C 3/08 223/1 |
| 8,607,720 B1 * | 12/2013 | Gardner | D05C 7/02 112/103 |

* cited by examiner

*Primary Examiner* — Tajash D Patel
(74) *Attorney, Agent, or Firm* — Sandberg Phoenix & von Gontard, P.C.

(57) ABSTRACT

A multi-use hoop framing board and accessories, if any, manufacturing method includes obtaining precision cut and drilled extruded acrylic and polypropylene embroidery board pieces and hardware for assembling a multi-use hoop framing board. The steps include printing one or more of the board pieces and/or accessories to provide for pre-determined alignments and utilization of the embroidery board pieces in desired operating units. The pieces and hardware are then assembled into a multi-use hoop framing board.

6 Claims, 5 Drawing Sheets

PROCESS FOR MAKING A HOOPING DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The subject matter described herein relates generally to processes for making multiple component board frames capable of providing for efficient transition of frame support for hooping devices used in embroidery applications. More particularly, it relates to improved methods for making such devices which permit precision in all dimensions and quick and easy transition between various hooping applications.

While traditional hooping mounting frame apparatuses were noted for their complexity, see, e.g., U.S. Pat. Nos. 4,545,127; 4,805,297; and 5,432,990; applicant had previously developed a single board apparatus which offered a range of sizes and shapes for embroidering. See U.S. Pat. No. 5,934,210, "Embroidery Board Supporting Hoops", the full content of which is incorporated herein by reference as though fully set forth herein.

Applicant has developed an improved process for constructing an embroidery framing device which provides for enhanced precision of dimensions, improved durability and greater efficiency of use for diverse purposes when the constructed board is utilized to set up hoops to frame fabric for embroidery.

BRIEF SUMMARY OF THE INVENTION

Accordingly, applicant has developed a process for improved precision, durability and efficiency for a multi-use hoop framing board and/or accessories.

A process for making a precision multi-use hoop framing board and accessories, if accessories are included, is provided. The process includes the step of obtaining precision cut and drilled extruded acrylic and polypropylene, or material of similar qualities (hereinafter referred to as "acrylic and propylene") embroidery board pieces and hardware for assembling a multi-use hoop framing board. The process further includes printing one or more of the board pieces to provide for pre-determined alignments and utilization indications of the embroidery board pieces to create desired operating units. The process also includes the step of assembling the multi-use hoop framing board from the printed board pieces and hardware.

In a further embodiment, the process includes the step of using a CO2 laser cutter to precision cut the extruded acrylic and polypropylene pieces.

In yet an additional embodiment, the process includes preparing accessories for the multi-use board frame including at least a leveling aid for assistance in placement of hooping devices at various locations on the framing board.

In a further embodiment, the process is divided into making pre- and post-shipment, or sale, sets of components for assembly so that the multi-use hoop framing board and accessories are allowed to be shipped in shipping packaging which is more compact and takes up less space, and, therefore, is less costly to ship.

BRIEF DESCRIPTION OF THE DRAWINGS

The presently disclosed subject matter will be better understood from reading the following description of non-limiting embodiments, with reference to the attached drawings, wherein below.

DESCRIPTION OF THE PREFERRED EMBODIMENT

The foregoing summary, as well as the following detailed description of certain embodiments will be better understood when read in conjunction with the appended drawings. As used herein, an element or step recited in the singular and preceded with the word "a" or "an" should be understood as not excluding the plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments as described and shown herein provide a process for making a precision-fit, highly durable and efficient-to-use multi-use embroidery hoop framing board or framing board and accessories. While providing precision-made parts made for long use, the multi-use framing board so constructed can be used in multiple ways with multiple sizes and shapes of clothing or fabric to be embroidered.

Figure 1:
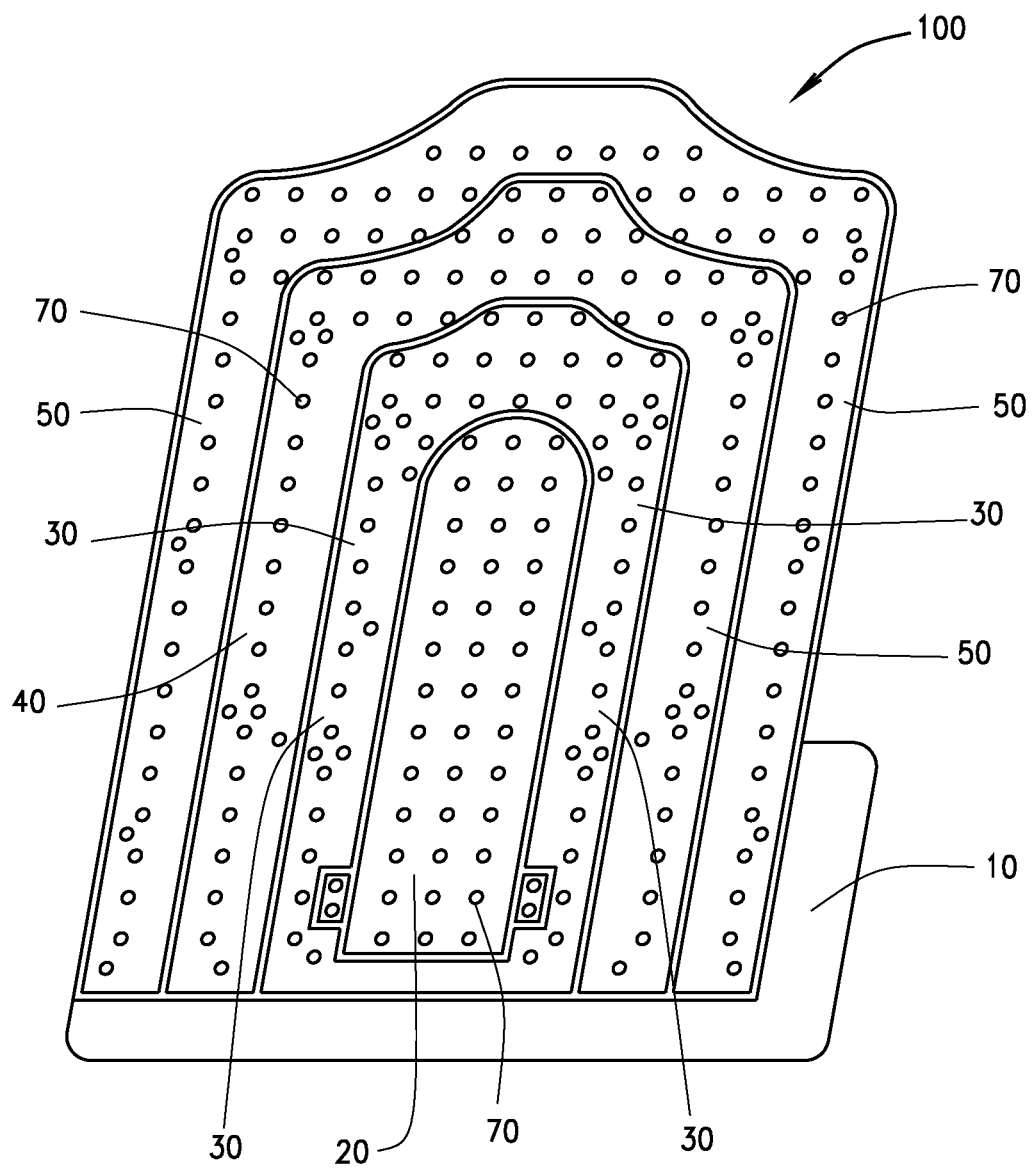
FIG. 1 is a front perspective view of a multi-use hoop framing board made according to an embodiment of the method of the invention.

Referring to the drawings, in one embodiment of the invention, a multi-use hoop framing board 100 may be seen in FIG. 1.

In the embodiment shown in FIG. 1, the multi-use hoop framing board 100 can be described as a, e.g., "five-in-one", or more, multi-use framing board which, based on its construction and the operating decisions made, can be positioned to frame fabric in hoops for a wide variety of embroidery applications for adults, juniors, toddlers, infants and sleeves. With the inclusion of extensions, the device can add "extra-large" adults, e.g., as an additional use adaptation. (See below.) Moreover, as described herein, with only a few adjustments, the multi-use framing board is readily converted from one size or use application to another.

Further, in yet additional embodiments of the framing board and system made by the method of the invention, various useful accessories may be added. These include at least an embroidery hoop leveling device 200, for use in conjunction with the framing board 100 to facilitate easy and accurate hooping. In the depicted embodiment, the fully constructed multi-use framing board includes a base 10 upon which the framing board 100 rests. Proceeding outwardly from the most inner component and in a generally planar configuration, a sleeve board 20, which depending on its positioning, may double as an infant framing board, sits within (and can be combined with) the next larger board to constitute a toddler board 30. The toddler board 30 (including the sleeve board 20) which in turn sits within (and can be combined with) a "junior" board 40, which in turn (including the smaller boards mentioned above) sits within (and can be combined with) an "adult" board 50. The making of other variations of the multi-use board application are contemplated as being within the scope of the invention. For example, for an "extra-large" size adjustment, left and right side extensions can be included.

Other components and accessories for the multi-use framing board 100 will be identified in the description of the process of making the framing board outlined below.

An embodiment of the process for making a precision multi-use hoop framing board according to the invention includes the step of obtaining precision laser cut and drilled extruded acrylic and polypropylene embroidery board pieces, together with hardware specific for enhanced assembly of such a precision cut hoop framing board. Alternatively, the process can include the steps of precision laser cutting of the acrylic and polypropylene board pieces and drilling the pieces so that they may be constructed to exacting standards using the predetermined hardware designed for piecing together the hoop framing board.

A main plate 110 of extruded acrylic is obtained to manufacture the framing board 100. Extruded material is preferred for use, e.g., over cast material, because applicant's invention provides for a very consistent thickness throughout the dimensions of the main plate 110, and its machining holds to a tighter thickness tolerance. This observation applies throughout for the various sheet components used in constructing the framing board and accessories mentioned herein.

For the main plate 110, the thickness of the acrylic sheet is from one-half" to 1", preferably from ⅝ to ⅞", and most preferably ¾" with continuous gradations between these dimensions contemplated. In a further embodiment of the method of the invention, the process involves utilizing a CO2 laser cutter A which applicant discovered gives a most exacting precision cut to extruded acrylic and polypropylene pieces.

In a preferred embodiment, a 4'×8', or other appropriately-dimensioned sheet of the extruded acrylic is first sized down by saw cutting or other standard means for the laser cutting. The extruded material is preferably double masked with thin protective paper sheets 111*a* and 111*b*, front and back, to help protect it during the material preparation and laser cutting process. The top layer sheet 111*a* is peeled back during the actual laser cutting (see FIG. 2). As described, the framing board parts and leveler accessory pieces are cut using the CO2 laser A, see FIGS. 2 and 3, which Applicant has discovered effectively cuts through the material and creates a highly polished edge to the board parts. Moreover, the CO2 laser A has been discovered to cut within a highly desirable +/−0.005" tolerance for the size of the extruded acrylic or polypropylene part. For purposes of the process of the invention, the acrylic board pieces are precision cut to within +/−0.010", preferably to within +/−0.0075", and most preferably to within +/−0.005" tolerances, with continuous gradations between these dimensions contemplated, for the size of the part.

The sleeve board 20 component is also cut from clear extruded acrylic of the same dimensions as the main plate 110 and after laser cutting has its second (underside) protective surface peeled away. Preferably, the sleeve board is then flamed to ease the sharpness of the sleeve board's edges in readiness for a screen printing process. To prepare the sleeve board 20 for the screen printing process, the sleeve board 20 must be clean and must have tension applied in order to then be coated with selected emulsions that will allow the films of two or more different colors to be exposed onto the screens. After the screens are rinsed and cleaned, they are ready to be installed into the screen printing presses. The machine is adjusted to the thickness and area of the print. The part is then printed, preferably in two colors, (e.g., black & red) one at a time, to register the holes & outside shape with a print tolerance of +/−0.030", preferably +/−0.015", with continuous gradations between these dimensions contemplated.

In an embodiment, ultra violet ink may be used and cured under ultra violet lights in a drying rack. A blank after undergoing UV treatment can then be masked to protect it during the laser cutting process. The blank may then be cut using a CO2 laser A, which cuts through the material and in the process creates a polished edge to the part and cuts.

Figure 2:
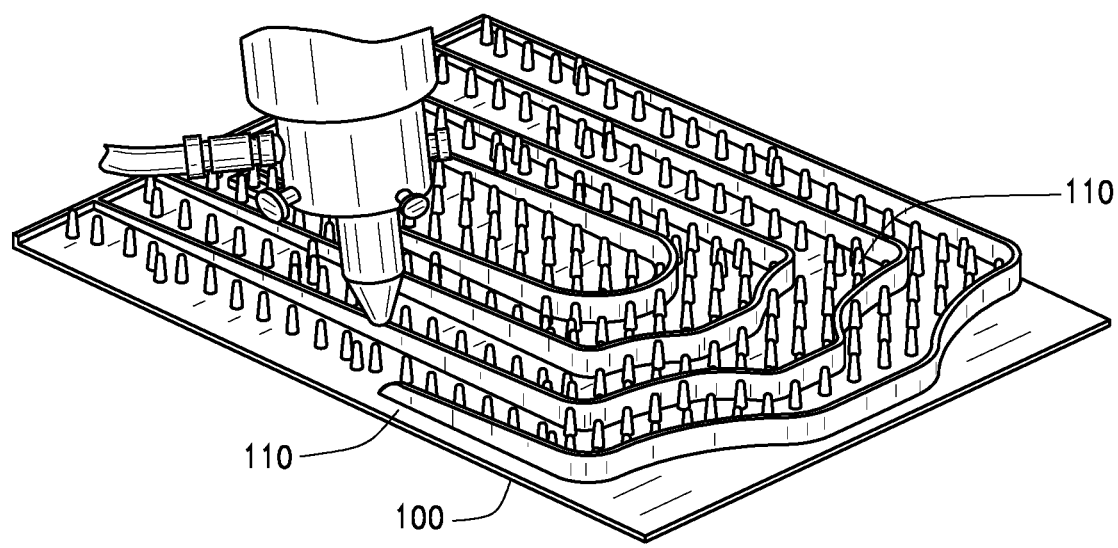
FIG. 2 is a depiction of an acrylic blank showing it as it is being laser cut according to an embodiment of the method referenced in FIG. 1.
Figure 3:
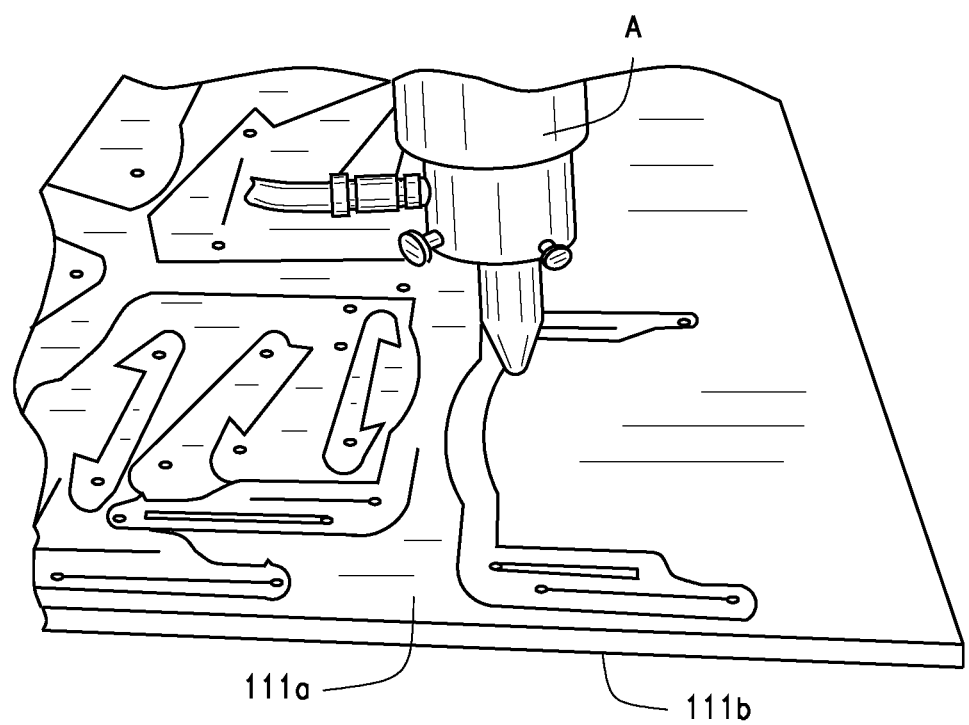
FIG. 3 is a depiction of a CO2 laser in use in an embodiment of the process of the invention to precision cut pieces used in constructing the board and accessories.

A depiction of the layout of a preferred laser cutting session of the parts in an embodiment of the multi-use framing board main plate 110 are shown in FIGS. 2 and 3.

A useful accessory for the multi-use hoop framing board is a leveling unit 200, which serves to provide a leveling frame of reference for placement of the hooping device. This leveling unit 200 also takes form from an acrylic or polypropylene plate which can be first saw cut from a 4'×8', or other appropriately sized sheet of clear extruded acrylic or polypropylene (of same or similar thickness as for the main plate 110). The plate for the leveler unit 200 is also preferably double masked with thin protective paper sheets 111*a* and 111*b*, front and back, to help protect it during the material preparation and laser cutting process. The top layer sheet 111*a* is peeled back during the actual laser cutting. The blank for the leveler unit 200 can then be peeled on one side and, again, preferably printed in two colors (e.g., black & red) in register to each color within a tolerance of +/−0.030, preferably +/−0.015", with continuous gradations between these dimensions contemplated. In this embodiment, the blank is laser cut using a CO2 laser A, which readily cuts through the material. Through this process of laser cutting, a polished edge is imparted to the parts and the laser cuts with a +/−0.010", preferably with a +/−0.0075", and most preferably with a +/−0.005" tolerance as to the size of the part and within +/−0.030", preferably +/−0.015" to registration of the printing, again, with continuous gradations between these dimensions contemplated. A photographic depiction of a laser cutting session showing where leveling unit and related pieces are cut from an acrylic blank in a preferred pattern of to form the parts of an embodiment of the hoop leveling unit is shown in FIG. 3.

Other sets of parts such as slide locks, extension arms, hoop brackets, as well as variations of leveler parts may be made from polypropylene and may be made from other materials including, but not limited to, PolyEthaline®, Teflon® and Delron®. In preferred embodiments, one set of parts is made from ⅛ to ⅜", preferably ¼" white, and the base plate 10 from ⅜ to ⅝", preferably ½" black, polypropylene material, again with continuous gradations between these dimensions contemplated. These can also be obtained in 4'×8' sheets and then cut down in size for the laser cutting. Again, a protective layer of masking preferably is applied to both sides of this blank to help protect it during the laser cutting process. The parts are cut using a CO2 laser A, which cuts through the material with an error margin of +/−0.010, preferably +/−0.075, and most preferably a 0.005" tolerance, again with continuous gradations between these dimensions contemplated for size for the part.

As mentioned above, in certain preferred embodiments, the process includes preparing accessories for the multi-use board frame 100 such as a "leveler" or leveling aid 200 for assistance in measured placement of hooping devices at various locations on the framing board.

The process also includes the step of making or obtaining precision drilled holes in the extruded acrylic and polypropylene embroidery board and accessory pieces. The process further includes printing one or more of the board pieces to provide for pre-determined alignment of the embroidery board pieces and their use indications to create desired operating units. The process also includes the step of assembling the printed board pieces and hardware into the completed multi-use hoop framing board as illustrated herein.

Figure 4:
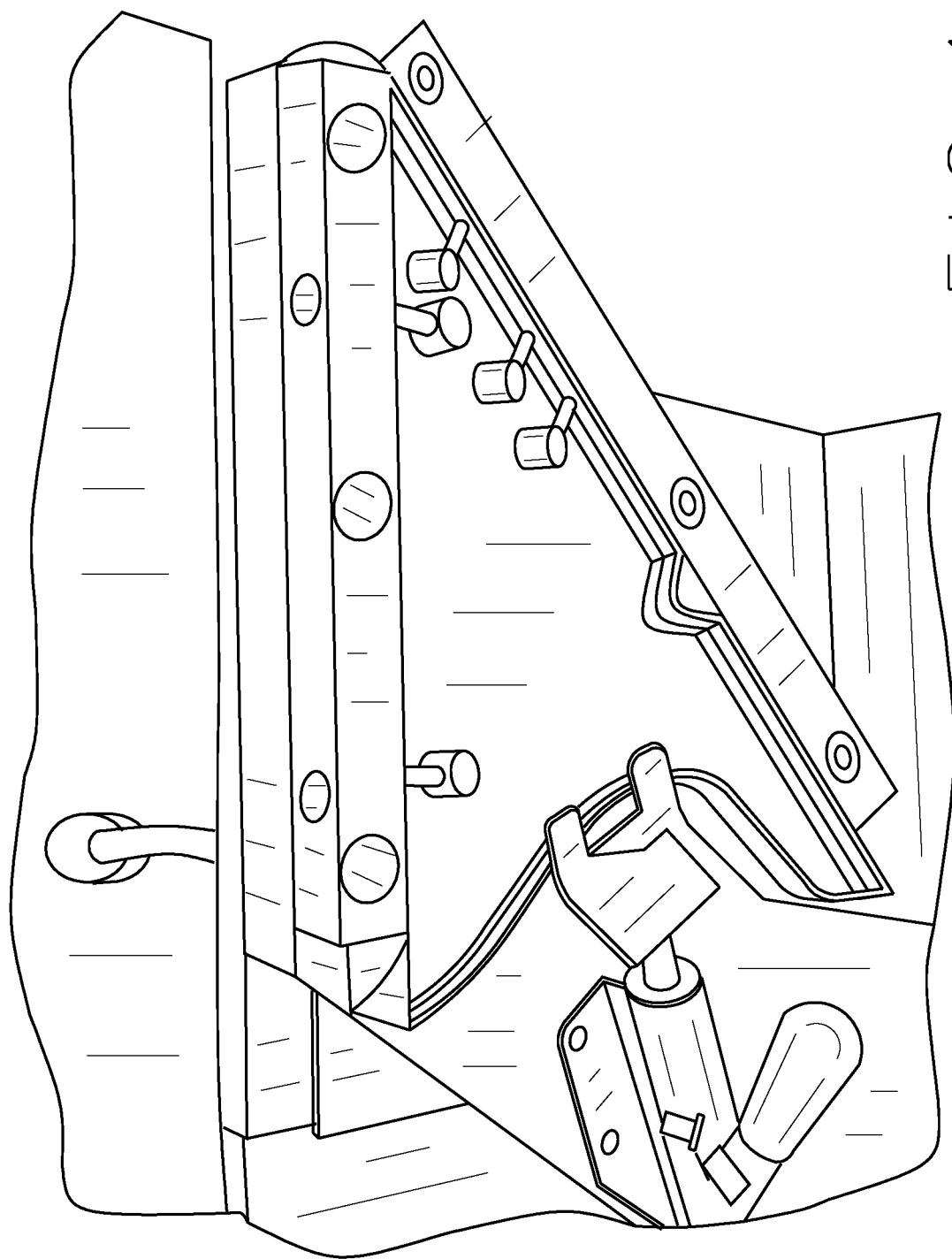
FIG. 4 is a depiction of a jig used in an embodiment of the method of the invention for drilling holes in the boards and leveler units.
Figure 5:
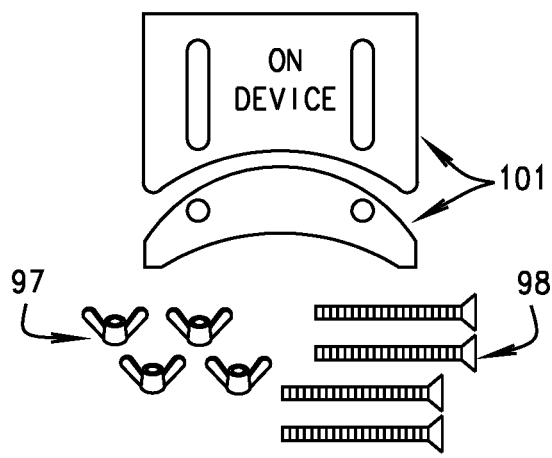
FIG. 5 is the sleeve board bracket used to attach the sleeve board to the multi-hoop framing board.
Figure 7:
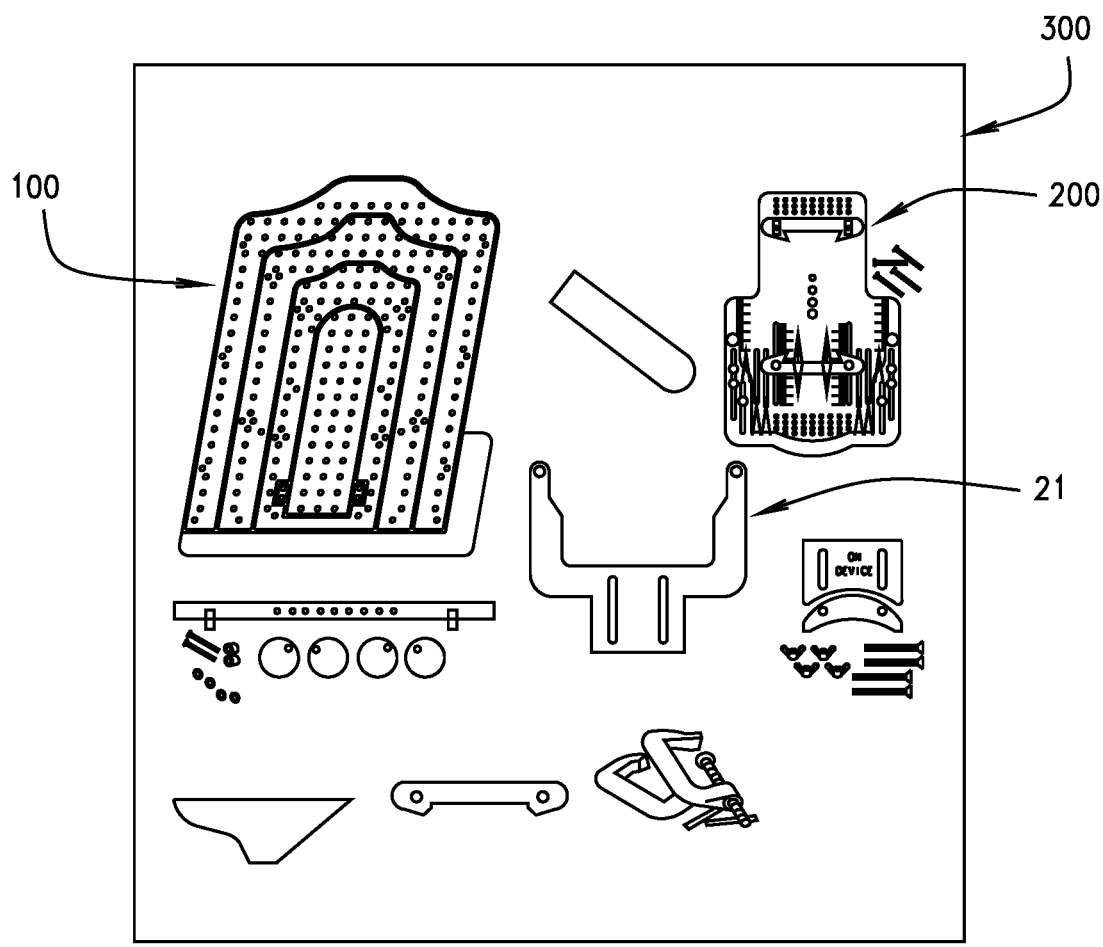
FIG. 7 is an exploded view of all the component parts of the multi-hoop framing device.
Figure 6:
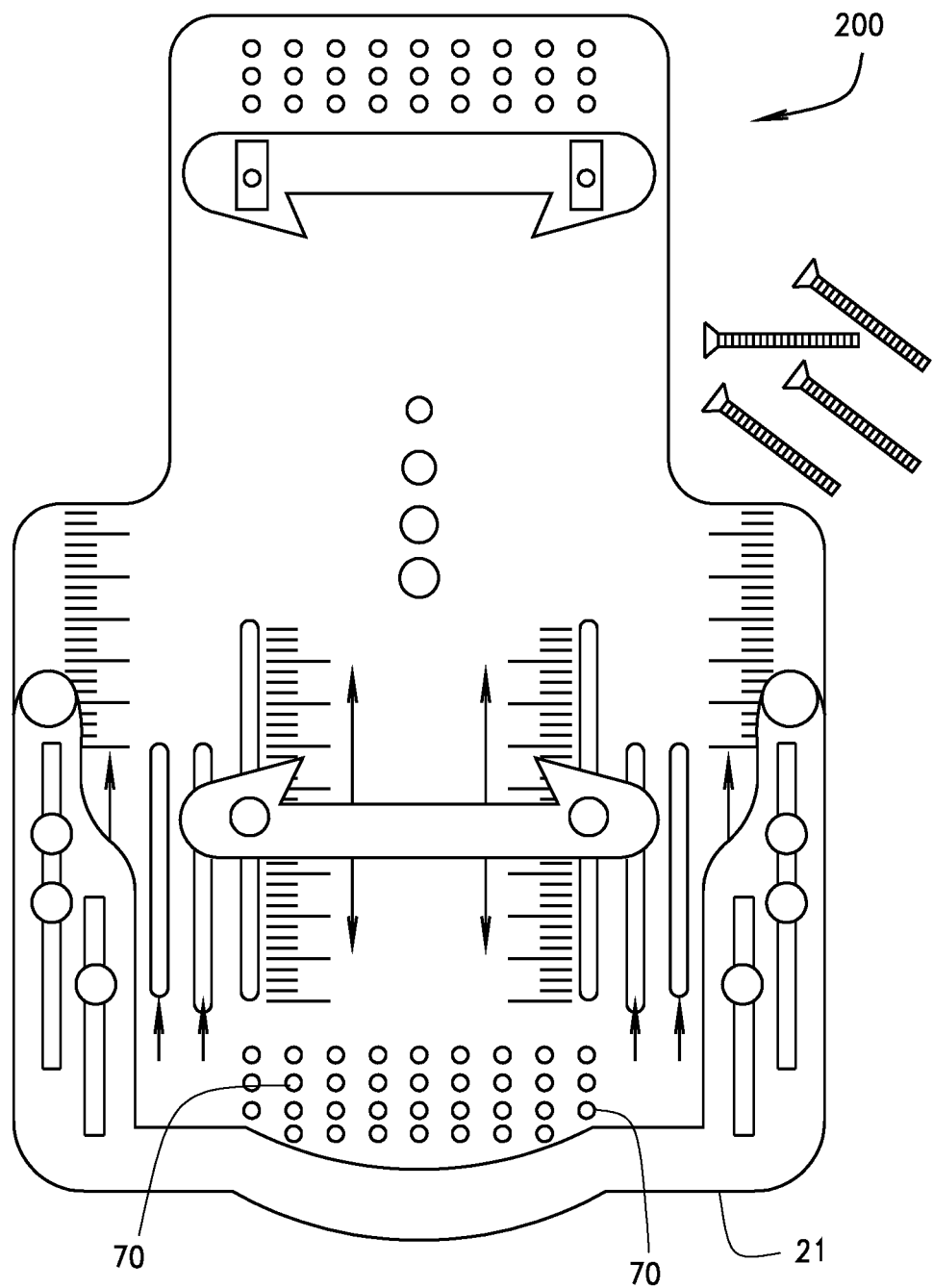
FIG. 6 is a leveling unit which serves to provide a leveling frame of reference for placement of the hooping device.

In an embodiment, precision drilled holes 70, shown in bold in FIG. 1 are tapped out to a 10/24 screw thread. These holes 70 can support various board and accessory hardware items (see FIG. 4) such as black stops, slide locks, and hinges used in constructing the framing board 100 and its accessories. The precision drilled holes 70 can be precision drilled using, e.g., a 10-24×⅞" tapping unit, which comes with a reversing mechanism and is preferably used on a drill press.

The complete outside end of all sized units on the main plate 110 of the multi-use framing board 100 is preferably heat polished with map gas.

Using a jig B (see FIG. 4) for accuracy and efficiency, six 0.190 (¼") holes 70 can be drilled through in each brace used to support the main plate, preferably at a 45 degree angle, as well as the horizontal base plate 10. Dowel nuts are preferably used to tie all the components together, i.e., the braces to the main plate 110 and the braces to the base plate 10. See FIG. 1. In an embodiment, twelve 1½"×10-24 flat Phillip's head screws 95 are inserted. The use of a jig B allows holes of a specific tolerance to be drilled out quickly and with faster production times, where before the instant invention, each would have had to be measured and scribed.

Drilling and counter sinking of holes 70 in positions shown in bold (see FIG. 1) are made in the ⅝ to ⅞", preferably ¾", with continuous gradations between these dimensions contemplated, extruded acrylic for the sleeve board. In a preferred embodiment, ⅛" holes 70 are drilled on each side of the blocks and the main sleeve board 20 to allow a ⅛" solid pin to be inserted into the hole so that the sleeve board 20 can fold out and pivot in a hinged manner. In an embodiment, holes shown in bold are filled using a Brass Press Fit nut 97 to mount 10/32×1 ½" flat Phillip's head screws 98 where the sleeve board leveler arm 21 mounts. A Tri-Nut fastener can be used to lock them into place. The sleeve board leveler arm 21 is inserted using holes marked in distinctive color. They are countersunk and a 10/24 screw is used to hold a plastic threaded ball knob in place at left and right lower end portions of the sleeve board leveler arm 21.

As shown, the sleeve board 20 includes mounting holes 70 at its top end with vertical slots below the mounting holes 70 to move the sleeve board's leveler arm 21. Thumb screws are engaged in the slots to lock in the leveler arm 21 after its height has been adjusted to a desired location based on a calibration using ruler line numbers to assist in keeping the leveler arm 21 balanced on both its left and right sides. The leveler arm 21 has left and right arm portions which assist in keeping the tubular hoop arm straight. Garment location markings (such as, e.g., letter or symbol indicators) can be printed on the approximately lower third of the sleeve board 20 to assist in garment location. Top and bottom brackets are also inserted into the approximately lower third portion of the sleeve board to hold hoop rings in place. In a preferred embodiment, short vertical slots are drilled into the mid-portion of the sleeve board 20 so that the top bracket can be flexibly re-positioned for differing sized hoop rings. Left and right tubular hoop arm ball rests, previously discussed, are attached to the lower portions of the left and right arms to assist in keeping the hoop arms straight while pushing in the hoop.

A type of jig B for drilling the sleeve board that may be custom made for specific orders or details can be used, but in certain embodiments of the invention, can also be commercially designed. The jig allows the sleeve board 20 to be drilled out with the ⅛" pin holes 70 in the blocks and main sleeve board 100 which have been printed for alignment and use.

1½"×10-24 flat Phillip's head screws are countersunk in the ½" black polypropylene material of the, e.g., black base plate 10 to attach the base plate 10 to the braces. The leveler plate accessory, consisting of printed ¼" acrylic—clear plastic bumpers, is used on the back side for slip protection when placed on the hoop framing board's main plate 110.

Also, on the back side are weld nuts used to work in conjunction with thumb screws. Top and bottom bracket holes 70 are countersunk. Sleeve board leveler arm holes 70 are countersunk and thumb screws secure the leveler arm 21 to the main leveler. On the back side a weld nut is used to tighten the screw in place.

Additional accessories for the multi-use hoop framing board can be included. It should also be noted that one or more components of embodiments of the hoop multi-use framing board and/or accessories such as the leveling unit, hooping devices and other attachments can be added, sold or used separately, e.g., as a replacement part, or the system may be embodied as a set, e.g., where one or multiples of the components are sold as separate units from the rest as a partial do-it-yourself construction set to finish construction from an initial partially constructed or combined "set". All such methods of constructing the multi-use framing boards and/or accessories and attachments thereto are contemplated as being within the scope of this invention. An exploded view of the component parts 300 are shown in the figures.

The size of one or more of these embodiments and their components may be increased or decreased as needed to adjust for the different sizes of clothes and the area that is to be embroidered.

The above embodiments and the order of component combination are meant to be illustrative.

It is to be understood that the above description, embodiments and the order of component combination is intended to be illustrative, and not restrictive. For example, the above-described embodiments and/or aspects thereof may be used in combination with each other. In addition, many modifications may be made to adapt a particular situation or material to the teachings of the various embodiments of the invention without departing from their scope. While any dimensions and types of materials described herein are intended to define the parameters of the various embodiments of the invention, the embodiments are by no means limiting and are exemplary embodiments except to the extent particularly noted or featured. Many other embodiments will be apparent to those of skill in the art upon reviewing the above description. The scope of the various embodiments of the invention should, therefore, be determined with reference to the appended claims and the full scope of the disclosure, along with the complete scope of equivalents to which such claims are entitled.

This written description uses drawings and examples of components used and steps taken to disclose the various embodiments of the invention, including the best mode, and also to enable any person skilled in the art to practice the various embodiments of the invention, including making and using any devices or systems and performing incorporated methods. The patentable scope of the various embodiments of the invention may include other examples that occur to those skilled in the art based on the principles explained herein. Such other examples are intended to be within the scope of the claims and description if the examples have structural elements that do not differ from the literal language of the claims and above description, or if the examples include equivalent structural or functional elements with insubstantial differences from the literal languages of the claims or description.

What is claimed is:

1. A process for making a multi-use hoop framing board and accessories, if any, comprises the step of obtaining precision cut and drilled extruded acrylic or polypropylene embroidery board pieces, or a combination thereof and hardware for assembling the multi-use hoop framing board; printing one or more of the embroidery board pieces and accessories to provide for pre-determined alignments and utilization of the now printed embroidery board pieces in desired operating units of two or more hoop framing operations; and assembling the multi-use hoop framing board adapted for performing the two or more hoop framing operations from the printed embroidery board pieces and accessories.

2. A process as set forth in claim 1 wherein the step of obtaining precision cut extruded acrylic embroidery board pieces further comprises obtaining such precision cut extruded acrylic embroidery board pieces wherein a $CO_2$ laser cutter has been used to cut the precision cut extruded acrylic embroidery board pieces.

3. A process as set forth in claim 1 wherein the step of obtaining precision cut extruded polypropylene embroidery board pieces further comprises obtaining such board pieces wherein a $CO_2$ laser cutter has been used to cut the extruded polypropylene pieces.

4. A process as set forth in claim 1 wherein the embroidery board pieces and accessories are precision cut with a +/−0.005" tolerance for piece size and +/−0.015" tolerance for registration of piece printing.

5. A process as set forth in claim 1 wherein the process includes preparing a leveling unit aid for assistance in placement of hooping devices at various locations on the multi-use hoop framing board and accessories.

6. A process as set forth in claim 1 wherein at least some portion of component assembly of the multi-use hoop framing board and accessories is designated for completion post-delivery to a product customer or recipient.

* * * * *